(12) United States Patent
Ko et al.

(10) Patent No.: US 6,300,934 B1
(45) Date of Patent: Oct. 9, 2001

(54) METHOD AND APPARATUS FOR ENTERING HANGUL (KOREAN) CHARACTERS

(75) Inventors: Soon Ko; Hiroshi Shirakawa, both of San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/192,802

(22) Filed: Nov. 16, 1998

(51) Int. Cl.[7] .............................. G09G 5/22; H04Q 7/20
(52) U.S. Cl. ................................ 345/141; 455/461
(58) Field of Search .................................. 345/141, 157, 345/171, 192, 193, 194, 195; 382/185; 707/535, 542; 455/461, 462

(56) References Cited

U.S. PATENT DOCUMENTS

| | | | |
|---|---|---|---|
| 4,670,841 | * 6/1987 | Kostopoulos | 707/535 |
| 4,827,530 | * 5/1989 | Yamaguchi et al. | 382/185 |
| 4,937,745 | * 6/1990 | Carmon | 707/535 |
| 5,519,443 | * 5/1996 | Salomon et al. | 348/467 |
| 5,717,425 | * 2/1998 | Sasaki | 345/157 |

\* cited by examiner

Primary Examiner—Williams A. Cuchlinski, Jr.
Assistant Examiner—Thu Nguyen
(74) Attorney, Agent, or Firm—Crosby, Heafey Roach & May (57) ABSTRACT

Described are methods and apparatuses for selecting Hangul components to form Korean characters on a screen located on electronic devices. All Hangul components are divided into three groups; namely, an initial consonant group, a medial vowel group, and a final consonant group. Any Hangul components can be found in these three groups. These three group Hangul components are alternatively displayed on a component display region (1006) located on the screen. At the beginning of inputting a Korean character, the first display region displays the initial consonant group in the component display region (1006). To form a Korean character, a user selects an initial consonant from the initial consonant group. Upon the selection of the initial consonant, the component display region (1006) displays the medial vowel group. The user then selects a medial vowel from the medial vowel group. Upon the selection of the medial vowel, the component display region (1006) displays the final consonant group. If necessary, the user selects a final consonant. The selected Hangul components are displayed in a character display region (1004) located on the screen to form a Korean character.

28 Claims, 6 Drawing Sheets

METHOD AND APPARATUS FOR ENTERING HANGUL (KOREAN) CHARACTERS

BACKGROUND OF THE INVENTION

1. Field of the Invention

This invention relates generally to a method and apparatus for entering Hangul (Korean) characters into electronic devices and, more specifically, to a method and apparatus for forming Hangul characters by selecting Hangul character components displayed on a relatively small display region.

2. Related Art

To enable the users who are only conversant with Korean language to efficiently operate electronic devices such as the cellular telephone and personal digital assistant (PDA), the instruction and information displayed on these electronic devices have to be in Korean language. The Korean written language uses two types of characters: Hangul and Hanja. Hangul is the native name for the Korean language, and Hanja is the Korean name for ideographic characters of Chinese origin. The Hanja characters are usually used in more formal written communications. Most daily communications are written in Hangul. Therefore, it is necessary to provide a mechanism to allow users to enter Hangul characters into electronic devices, because some information in electronic devices needs to be customized by individual users.

A Hangul character is usually composed of at least one consonant and a vowel. Conventionally, the whole set of Hangul consonants and vowels are assigned to the keys on a keyboard. For example, the whole set of Hangul consonants and vowels can be assigned to a computer keyboard having more no more than fifty keys when used with the SHIFT and ALT keys. However, the conventional method is not suitable for portable electronic devices which have few keys or do not have a keyboard at all. An external keyboard could be attached to these portable electronic devices. However, it is inconvenient to do so due to the small size of these portable electronic devices.

Furthermore, portable electronic devices typically have a relatively small display region. This increases the difficulty of entering Hangul characters.

There is, therefore, a need to provide a method and apparatus for entering Hangul characters into electronic devices that have few keys or do not have a key board.

There is another need to provide a method and apparatus for entering Hangul characters into electronic devices that have a relatively small display region.

The present invention provides the methods and apparatuses to meet these two needs.

SUMMARY OF THE INVENTION

To overcome the shortcomings in the available art, the present invention provides novel methods for selecting Hangul components to form Hangul characters.

In one aspect, the present invention provides a method for selecting Hangul components to form Hangul characters. The method comprises the steps of dividing the Hangul components into at least two groups including a first group and a second group, the first group containing a plurality of first group components and the second group containing a plurality of second group components; displaying the first group components on a first screen region located on a screen; selecting a first group component from the first group; displaying the second group components on the first screen region; selecting a second group components from the second group; and forming a Hangul character by combining the selected first and second group components.

In another aspect, the present invention provides a method for selecting Hangul components to form Hangul characters. The method comprises the steps of dividing the Hangul components into three groups including a first group, a second group and a third group, the first group containing a plurality of first group components, the second group containing a plurality of second group components, and the third group containing a plurality of third group components; displaying the first group components on a first screen region located on a screen; selecting a first group component from the first group; displaying the second group components on the first screen region; selecting a second group components from the second group; displaying the third group components on the first screen region; selecting a third group character components from the third group; and forming a Hangul character by combining the selected first, second and third group components.

The present invention also provides the apparatuses for performing the steps in the methods discussed above.

BRIEF DESCRIPTION OF THE DRAWINGS

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

The present invention provides novel methods and apparatuses for entering Hangul characters into electronic devices that have a relatively small display screen and few input keys.

Figure 1:
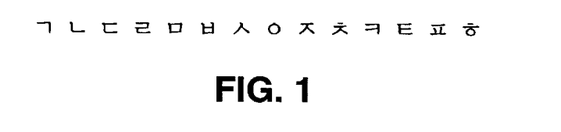
FIG. 1 depicts fourteen basic Hangul consonants.
Figure 2:
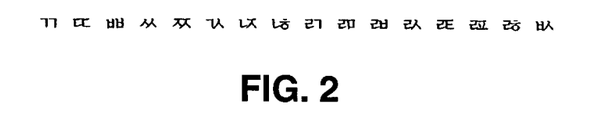
FIG. 2 depicts sixteen compound Hangul consonants.
Figure 3:
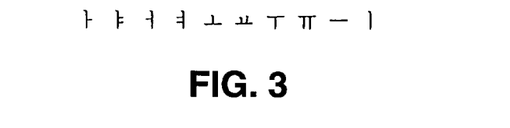
FIG. 3 depicts ten basic Hangul vowels.
Figure 4:
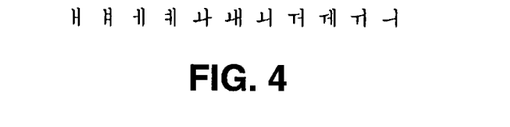
FIG. 4 depicts eleven compound Hangul vowels.

A Hangul character is a single syllabic character formed by combining one or two Hangul consonants with a Hangul vowel. FIG. 1 shows fourteen basic Hangul consonants. FIG. 2 shows sixteen compound Hangul consonants, each of which is formed by combining two or more basic Hangul consonants. FIG. 3 shows ten basic Hangul vowels. FIG. 4 shows eleven compound Hangul vowels, each of which is formed by combining two or more basic Hangul vowels. As shown in FIGS. 1–4, Hangul includes a total thirty of consonants and twenty vowels.

Figure 5:
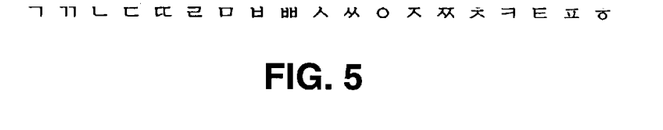
FIG. 5 depicts the initial consonant group (Choseong) containing nineteen Hangul consonants, in accordance with the present invention.
Figure 6:
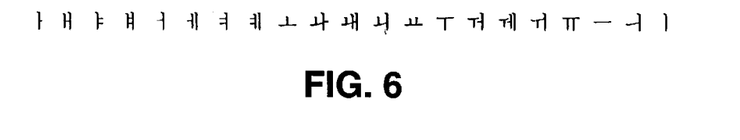
FIG. 6 depicts the medial vowel group (Jungseong) containing twenty one Hangul vowels, in accordance with the present invention.
Figure 7:
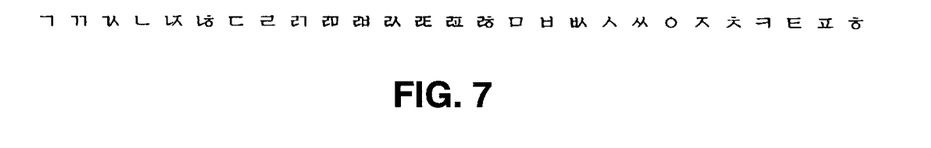
FIG. 7 depicts the final consonant group (Jongseong) containing twenty seven Hangul consonants, in accordance with the present invention.

In the present invention, to facilitate selections of Hangul components, the Hangul consonants and vowels shown in FIGS. 6 and 7 are divided into three groups, which include the initial consonant group (Choseong), the medial vowel group (Jungseong), and the final consonant group (Jongseong). FIG. 5 shows the initial consonant group containing nineteen of the thirty consonants, each of which can be a first component of a Hangul character. FIG. 6 shows the medial vowel group containing all twenty one vowels, each of which can be a second (or middle) component of a Hangul character. FIG. 7 shows the final consonant group containing twenty seven of the thirty consonants, each of which can be the last component of a Hangul character. A Hangul character can be formed by selecting one consonant from the initial consonant group, a vowel from the medial vowel group, and a consonant from the final consonant group, if needed.

Figure 8A:
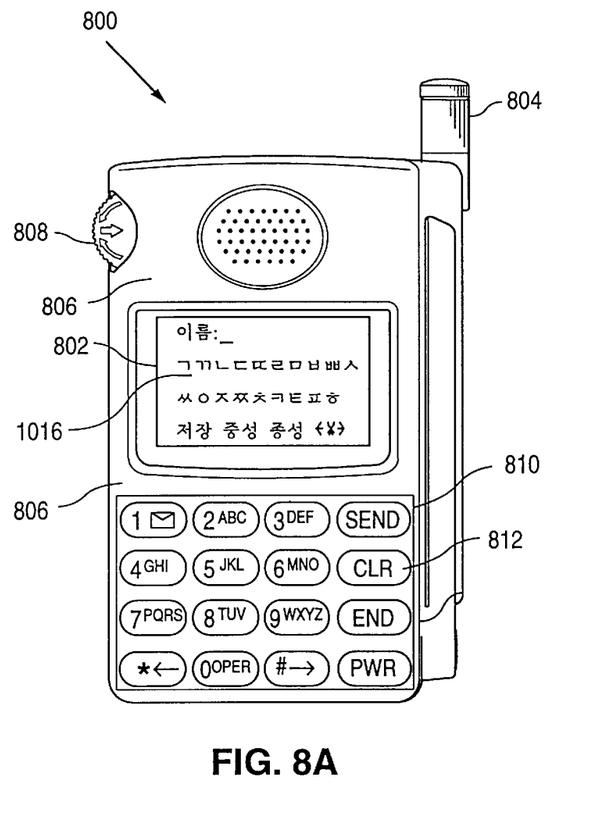
FIG. 8A depicts the front view of a cellular telephone that has the capability of entering Hangul characters, in accordance with the present invention.

Referring to FIG. 8A, the front view of a cellular telephone 800 is shown which has the capability of entering Hangul characters in accordance with the present invention.

Figures 10, 10A:
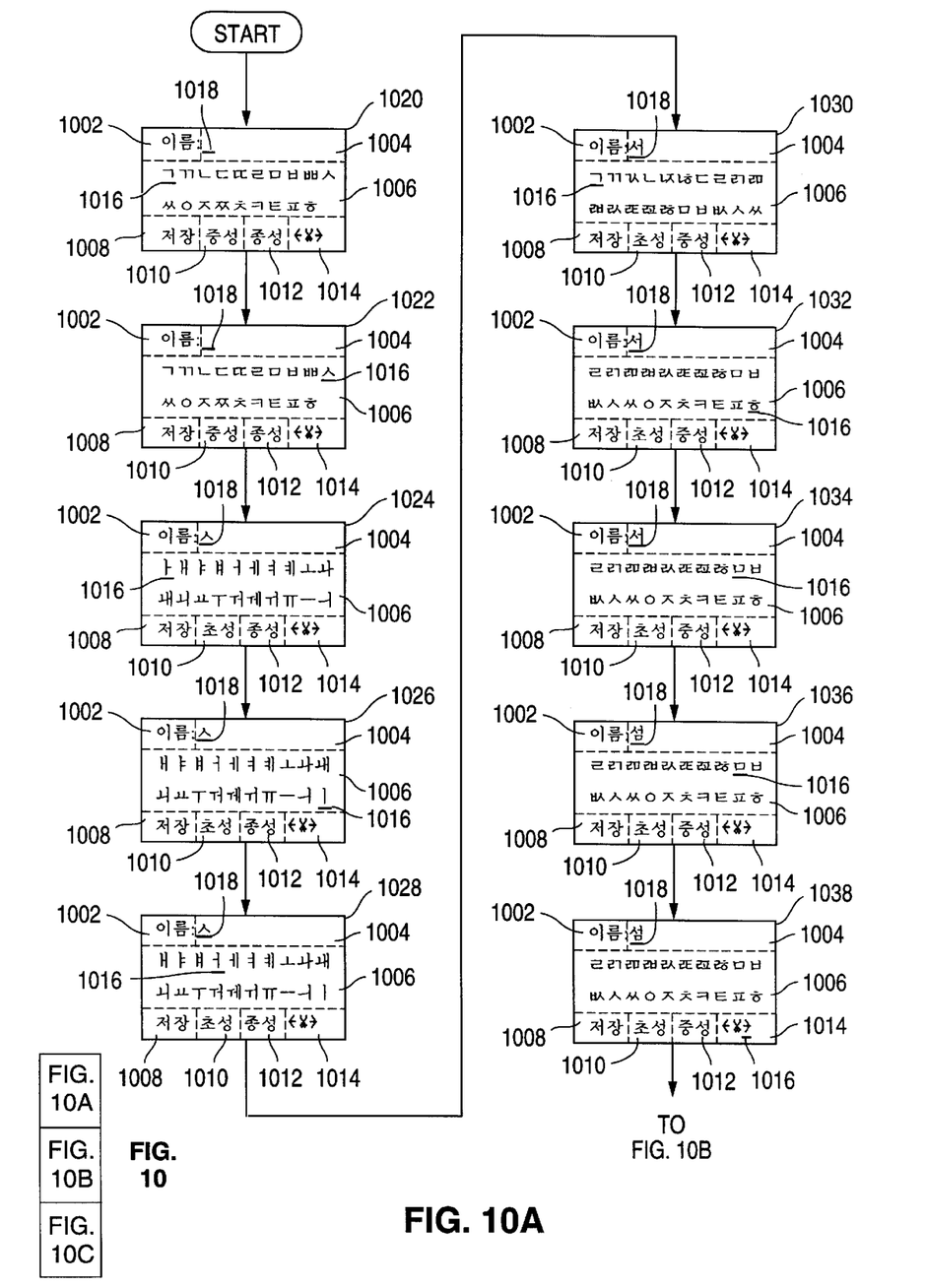
FIGS. 10A–10C depicts a sequence of screen shots, illustrating a process of selecting Hangul components, forming Hangul characters, and entering the formed Hangul characters into the cellular telephone shown in FIG. 8A, in accordance with the present invention.

As shown in FIG. 8A, the cellular telephone 800 includes a display screen 802, an antenna 804, and a control panel 806. The control panel 806 includes a jog dial wheel 808 and a key panel 810, including twelve alpha/numeric keys. The jog dial wheel 808 can be moved in three directions (turn-up, turn-down, and press-in), as indicated by the three arrows. The cursor 1016 (as will be discussed in greater detail in connection with FIG. 10) displayed on the display screen 802, can be moved to the left and right by turning the jog dial wheel 808 up and down, respectively. A character (or a command) displayed on the display screen 802 can be selected (or activated) by first moving the cursor 1016 to the character (or the command) and then pressing-in the jog dial wheel 808.

Figure 8B:
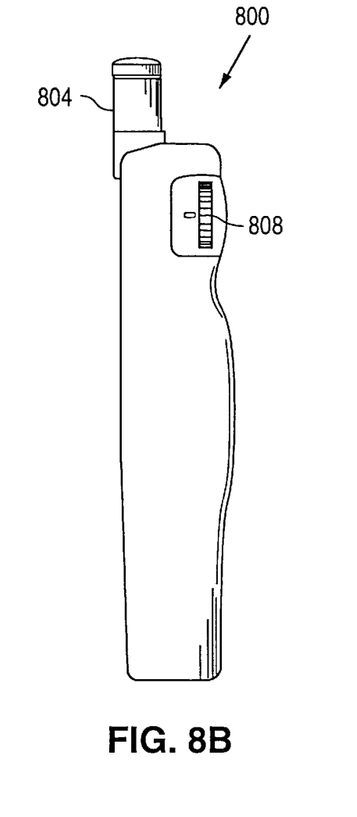
FIG. 8B depicts the side view of the cellular shown in FIG. 8A.

Referring to FIG. 8B, the side view of the cellular telephone 800 is shown to illustrate the side view of the jog dial wheel 808.

Figure 9:
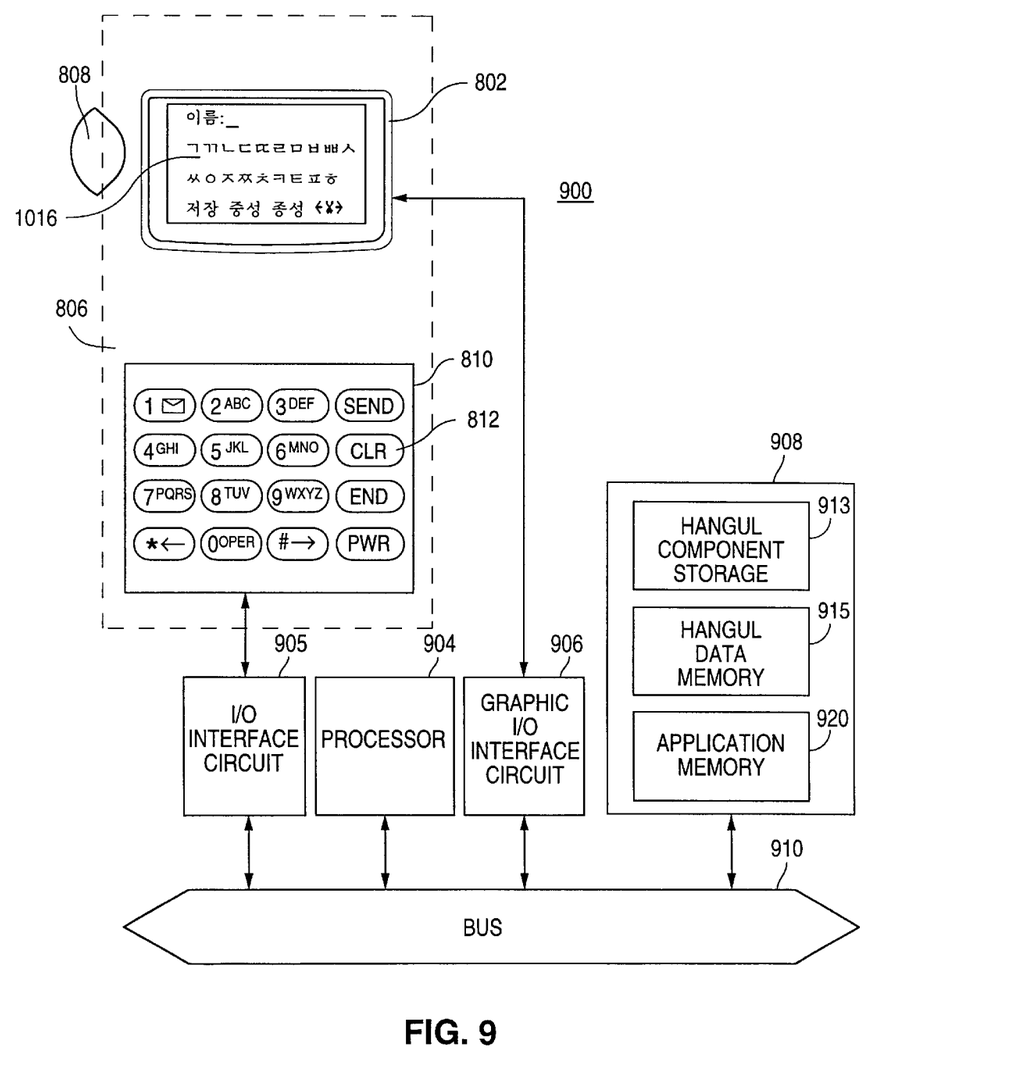
FIG. 9 depicts a block diagram, illustrating some components of the cellular telephone shown in FIG. 8A.

Referring to FIG. 9, a block diagram 900 is shown to illustrate some components of the cellular telephone 800 shown in FIG. 8A, in accordance with the present invention.

The block diagram 900 includes a processor 904, an I/O (input and output) interface circuit 905, a graphic I/O interface circuit 906, a memory 908, and a bus 910. The processor 904, the I/O interface circuit 905, the graphic I/O interface circuit 906, and the memory 908 are all coupled to the bus 910.

The memory 908 includes: (1) a Hangul component storage 913 for storing Hangul components (including Hangul consonants and vowels) to be displayed on the display screen 802, (2) a Hangul data memory 915 for storing the Hangul characters entered into the cellular telephone 800, and (3) an application memory 920 for storing an application to perform Hangul component selection and Hangul character formation.

The processor 904 controls the operations of the I/O interface circuit 905, the graphic I/O interface circuit 906, the memory 908, and the display region 802. More specifically, the processor 904 is able to: (1) get access to the Hangul components stored in the Hangul component storage 913, (2) interact with the control panel 806 via the I/O interface circuit 905, (3) display the Hangul components stored in the Hangul component storage 913 on the display region 802 via the graphic I/O interface circuit 906, (4) execute the application stored in the application memory 920 to form Hangul characters by selecting the Hangul components displayed on the display region 802, and (5) store the formed Hangul characters in the Hangul data memory 915.

In response to a user's activation of the jog dial wheel 808 or any key on the key panel 810, the control panel 806 generates a request signal, which is in turn sent to the processor 904 via the I/O interface circuit 905. In response, the processor 904 executes the application stored in the application memory 920, thereby performing a particular function for the request signal.

Figure 10B:
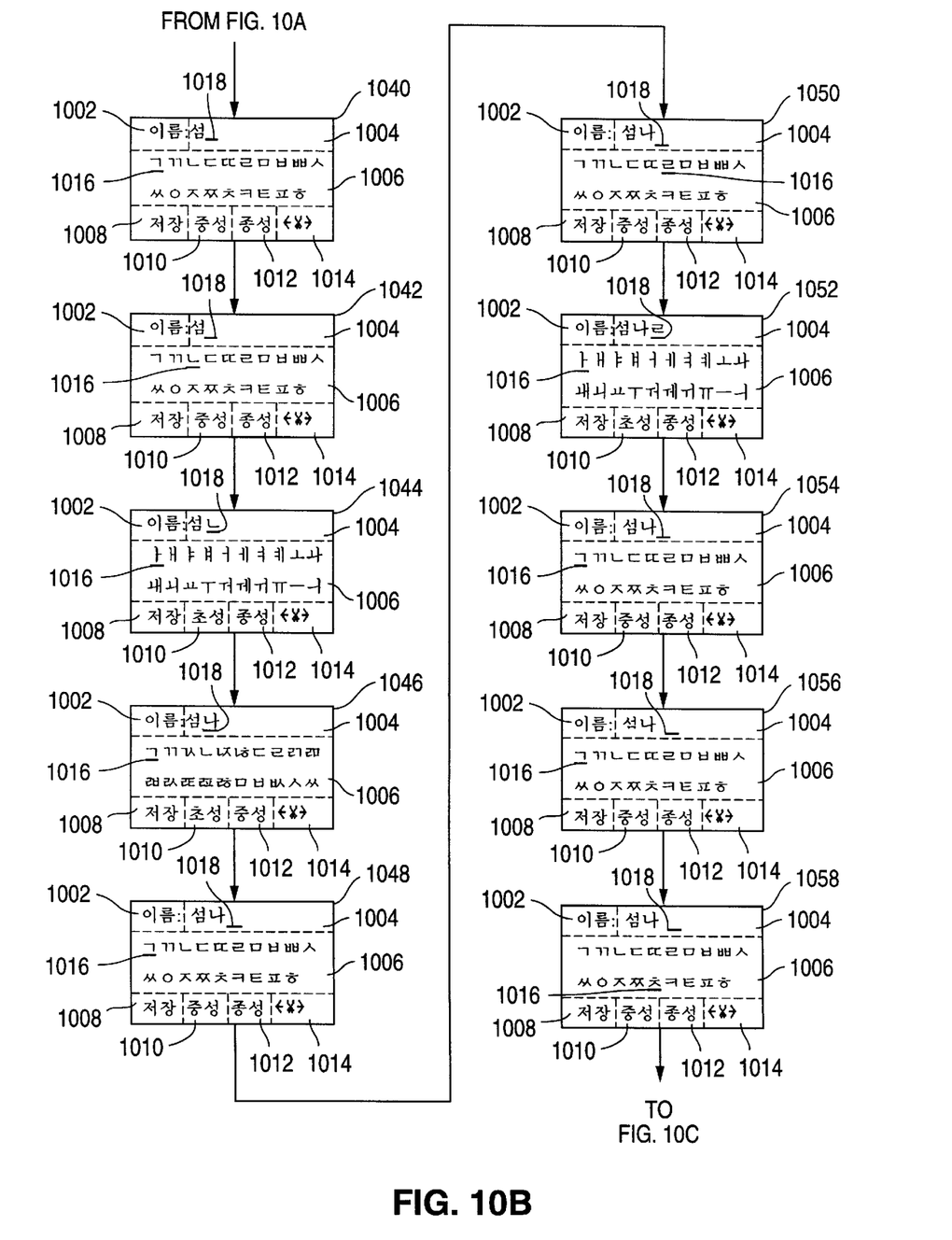
Figure 10C:
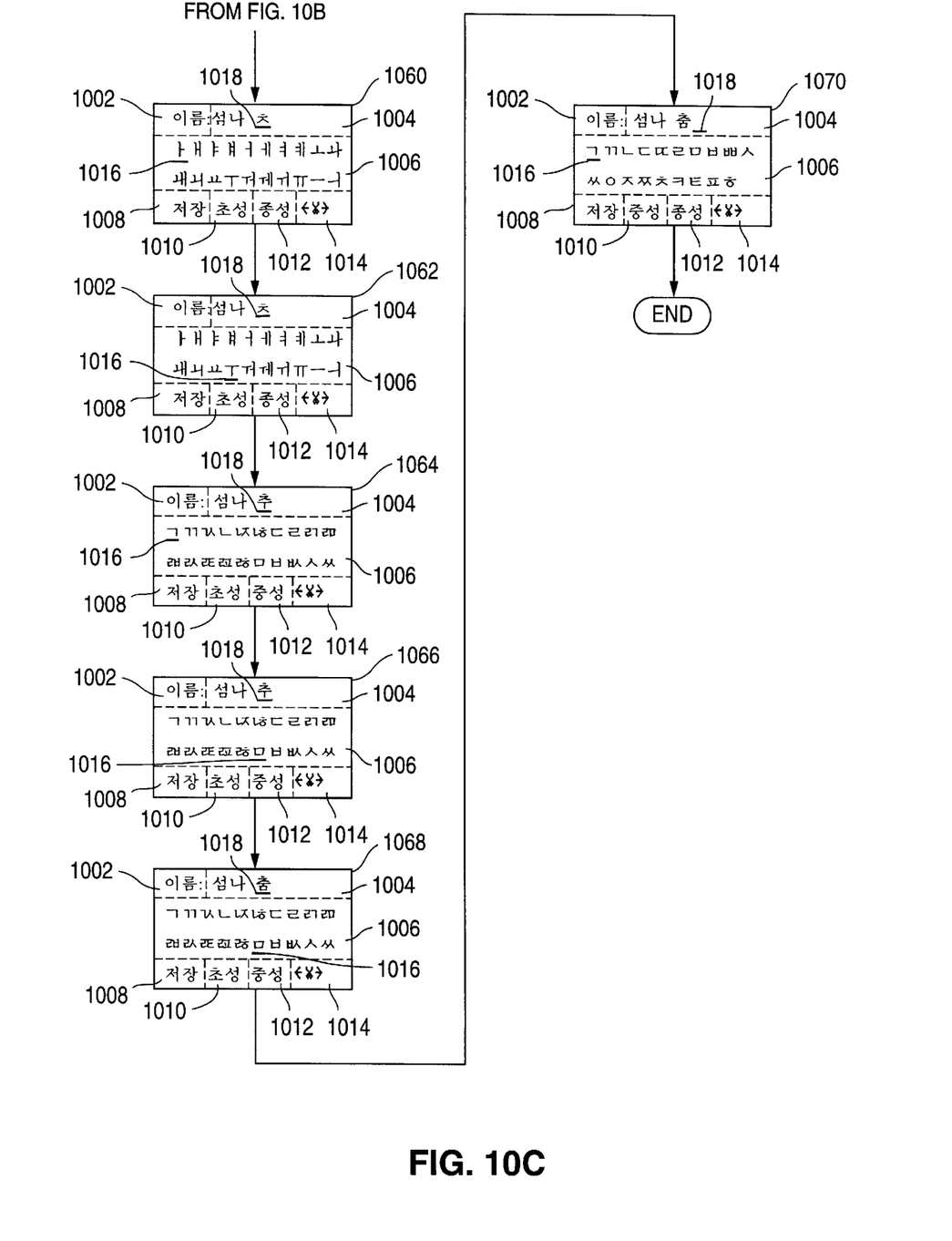

Referring to FIG. 10, a sequence of screen shots is shown sequentially displayed on the display screen 802 to illustrate a process of selecting Hangul components, forming Hangul characters, and entering the formed Hangul characters into the cellular telephone 800, in accordance with the present invention.

In describing the process shown in FIG. 10, it is assumed that a user has set the cellular telephone 800 in a Hangul character entering mode, enabling the processor 904 to execute the application stored in the application memory 920, thereby allowing the user to input a first Hangul component for a first Hangul character.

Screen Shot 1020:

The screen shot 1020 has seven display regions 1002, 1004, 1006, 1008, 1010, 1012, and 1014. The region 1002 displays "name" in Hangul. The regions 1004 displays Hangul characters formed using the Hangul character components selected by the user. The region 1006 displays the Hangul character components contained in one of the three Hangul groups. Since the cellular telephone 800 is set to input a first component for a first Hangul character, the region 1006 displays the nineteen initial consonants in the initial consonant group. The region 1008 displays a command "save" in Hangul for saving the Hangul characters that are displayed in the region 1004. The regions 1010 and 1012 display two commands for loading the Hangul component groups that are not displayed in the region 1006. Since the region 1006 displays the nineteen characters of the initial consonant group, the regions 1010 and 1012 currently display "medial vowel" and "final consonant" in Hangul, respectively.

The region 1006 contains a cursor 1016 pointing to the first Hangul consonant displayed on the screen shot 1020. The cursor 1016 can be moved to the left and right in the regions 1006, 1008, 1010, 1012, and 1014, by turning the jog dial wheel 808 up and down, respectively. The region 1006 has two display lines, each line containing ten full-size spaces and each full-size space containing two half-size spaces. A Hangul character occupies a full-size space, while an ASCII character occupies a half-size space.

When the cursor 1016 is located at the last space of the first display line, further turning the jog dial wheel 808 down moves the cursor 1016 to the first space of the second display line. When the cursor 1016 is located at the last space of the second display line, further turning the jog dial wheel 808 down moves the cursor 1016 to the region 1008. When the cursor 1016 is located in the region 1008, continuously turning the jog dial wheel 808 down moves the cursor 1016 consecutively from the region 1008 to the region 1014 through the regions 1010 and 1012. When the cursor 1016 is located at the "→" icon of the region 1014, further turning the jog dial wheel 808 down moves the 1016 to the first space of the first display line in the region 1006.

Similarly, when the cursor 1016 is located in the region 1014, continuously turning the jog dial wheel 808 up moves the cursor 1016 consecutively from the region 1014 to the region 1008 through the regions 1012 and 1010. When the cursor 1016 is located in the region 1008, further turning the jog dial wheel 808 up moves the cursor 1016 to the last space of the second display line. When the cursor 1016 is located at the first space of the second display line, further turning the jog dial wheel 808 up moves the cursor 1016 to the last space of the first display line. When the cursor 1016 is located at the first display line in the region 1006, further turning the jog dial wheel 808 up moves the cursor 1016 to the "→" icon in the region 1014.

The region 1004 has six full-size spaces and contains a cursor 1018. The cursor 1018 can be moved a full-size space or a half-size space, depending whether the input character is a Hangul character or an ASCII character.

In FIG. 10, all other screen shots have the same layout as screen shot 1020.

Screen Shot 1022:

To select the tenth Hangul consonant from the initial consonant group, the user moves the cursor 1016 to the tenth Hangul consonant in the initial consonant group and presses-in the jog dial wheel 808. In response, the processor 904 executes the application stored in the application memory 920 to select the tenth Hangul consonant from the initial consonant group and displays the selected Hangul consonant in the region 1004. The processor 904 then executes the application to display the medial vowel group in the region 1006 and the "initial" (in Hangul) in the region 1010.

Screen Shot 1024:

In the screen shot 1024, the initial consonant selected from the screen shot 1022 is displayed in the region 1004. In the region 1006, the initial consonant group is automatically replaced by the medial vowel group. The cursor 1016 automatically points to the first vowel in the medial vowel group. Since the initial consonant group is replaced by the medial vowel group, in region 1010 "medial vowel" (in Hangul) is replaced by "initial consonant" (in Hangul). Since the region 1006 contains only twenty full-size spaces, the twenty-first vowel is hidden.

Screen Shot 1026:

To display the twenty-first vowel hidden from the region 1006, the user first moves the cursor 1016 to the twentieth space in the region 1006 and then moves the cursor 1016 one space to the right. In response, the processor 904 executes the application to shift the vowel in the first space out of the region 1006 and shift the twenty-first vowel into the region 1006. To re-display the first vowel in the region 1006, the user first move the cursor 1016 to the first space in the region 1006 and then move the cursor 1016 one space to the left. In response, the processor 904 executes the application to shift the vowel in the first space into the region 1006 and shift the twenty-first vowel out of the region 1006.

Screen Shot 1028:

To select the fourth Hangul vowel from the medial vowel group, the user moves the cursor 1016 to the fourth Hangul vowel in the medial vowel group and then presses-in the jog dial 808. In response, the processor 904 executes the application to select the fourth Hangul vowel from the medial vowel group and displays the selected Hangul vowel in the region 1004. The processor then executes the application to display the final consonant group in the region 1006 and the "medial vowel" (in Hangul) in the region 1012.

Screen Shot 1030:

In the screen shot 1030, the vowel selected from the screen shot 1028 is displayed in the region 1004. In the region 1006, the medial vowel group is automatically replaced by the final consonant group. The cursor 1016 automatically points to the first consonant in the final consonant group. Since the medial vowel group is replaced by the final consonant group, in region 1012 "final consonant" (in Hangul) is replaced by "medial vowel" (in Hangul). Since the region 1006 contains only twenty full-size spaces, the twenty-first through twenty-seventh consonants in the final consonant group are hidden.

Screen Shot 1032:

In screen shot 1032, the user moves the cursor 1016 to the twenty-seventh Hangul consonant in the final consonant group, so that the twenty-first through twenty-seventh consonants in the last consonant group are displayed the region 1006. However, the first through seventh consonants in the last consonant group are now hidden.

Screen Shot 1034:

To select the sixteenth Hangul consonant from the final consonant group, the user moves the cursor 1016 to the sixteenth Hangul consonant in the final consonant group and then presses-in the jog dial wheel 808. In response, the processor 904 executes the application to select the sixteenth Hangul consonant from the final consonant group and displays the selected Hangul consonant in the region 1004. At this point, a first Hangul character is formed. The processor 904 keeps the final consonant group being displayed on the region 1006.

Screen Shot 1036:

In the screen shot 1036, a first Hangul character is formed in the first full-size space in the region 1004. If the user continuously selects different consonants from the final consonant group, the processor 904 will execute the application to replace the Hangul component previously selected. To delete the one or more components from the current character, the user can press the clear key 812 on the key panel 810 one or more times. In response, the processor 904 executes the application to delete one or more Hangul components from the current Hangul character displayed in the region 1004. However, after the user deletes all the Hangul components in the current character, the processor 904 will neither move cursor 1018 to the previous character (if any) nor delete any components in the Hangul character previously formed, even if there is one or more preceding characters in the region 1004. To move the cursor 1018 back, the user first moves the cursor 1016 to the "←" icon in the region 1014 and then presses the jog dial wheel 808. In response, the processor 904 executes the application to move cursor 1018 to the preceding Hangul character, if there are any characters previously formed.

Screen Shot 1038:

To move the cursor 1018 to the next full-size space in the region 1004, the user first moves the cursor 1016 to the icon "→" in the region 1014 and then presses the jog dial wheel 808. In response, the processor 904 executes the application to move the cursor 1018 in the region 1004 one full-size space to the right. The processor 904 then executes the application to display the "initial consonant" (in Hangul) in the region 1006, the "medial vowel" (in Hangul) in the region 1010, and the "final consonant" (in Hangul) in the region 1012.

Screen Shot 1040:

In the screen shot 1040, the initial consonant group is displayed in the region 1006; the cursor 1016 points to the first consonant in the initial consonant group; the cursor 1018 points to the second full-size space in the region 1004; the "medial vowel" (in Hangul) is displayed in the region 1010; and the "final consonant" (in Hangul) is displayed in the region 1012.

Screen Shot 1042:

To select the third Hangul consonant from the initial consonant group, the user moves the cursor 1016 to the third Hangul consonant in the initial consonant group and then presses-in the jog dial wheel 808. In response, the processor 904 executes the application to select the third Hangul consonant from the initial consonant group and displays the selected Hangul consonant in the region 1004. The processor 904 then executes the application to display the medial vowel group in the region 1006 and the "initial consonant" (in Hangul) in the region 1010.

Screen Shot 1044:

In the screen shot 1044, the initial consonant selected from the screen shot 1042 is displayed in the second full-size space of the region 1004. In the region 1006, the initial consonant group is automatically replaced by the medial vowel group, and the "initial consonant" (in Hangul) is displayed in the region 1010. To select the first vowel from the medial vowel group, the user presses-in the jog dial wheel 808. In response, the processor 904 executes the application to: (1) display the selected first vowel in the region 1004, (2) display the final consonant group in the region 1006, and (3) display the "medial vowel" (in Hangul) in the region 1012.

Screen Shot 1046:

In screen shot 1046, twenty of the twenty-seven consonants in the final consonant group are displayed in the region 1006. The twenty-first through twenty-seventh consonants in the final consonant group are hidden. At this point, the user determines that a second Hangul character is formed in the second full-size space in the region 1004. To input a third Hangul character, the user moves the cursor 1016 to the "→" icon in the region 1014 and then presses-in the jog dial wheel 808. In response, the processor 904 executes the application to: (1) move the cursor 1018 to the third full-size space in the region 1004, (2) display the initial consonant group in the region 1006, (3) display the "medial vowel" (in Hangul) in the region 1010, and (4) display the "final consonant" (in Hangul) in the region 1012.

Screen Shot 1048:

In screen shot 1048, the initial consonant group is displayed in the region 1006. The cursor 1016 points to the first consonant in the initial consonant group, and the cursor 1018 points the third full-size space in the region 1004.

Screen Shot 1050:

To select the sixth Hangul consonant from the initial consonant group, the user moves the cursor 1016 to the sixth Hangul consonant in the initial consonant group and then presses-in the jog dial wheel 808. In response, the processor 904 executes the application to select the sixth Hangul consonant from the initial consonant group and displays the selected Hangul consonant in the third full-size space in the region 1004. The processor 904 then executes the application to display the medial vowel group in the region 1006 and to display the "initial consonant" (in Hangul) in the region 1010.

Screen Shot 1052:

In the screen shot 1052, the initial consonant selected in the screen shot 1050 is displayed in the third full-size space in the region 1004. In the region 1006, the initial consonant group is replaced by the medial vowel group. The cursor 1016 automatically points to the first vowel in the medial vowel group. To delete the Hangul components previously selected in screen shot 1050, the user presses the clear key 812 on the key panel 810. In response, the processor 904 executes the application to delete the initial consonant selected in the screen shot 1050. The processor 904 then executes the application to display the initial consonant group in the region 1006 and "medial vowel" (in Hangul) in the region 1010.

Screen Shot 1054:

In the screen shot 1054, the initial consonant selected, and then deleted, in the screen shot 1052 is erased from the region 1004.

To insert a space after the second full-size space, the user moves the cursor 1016 to the "→" icon in the region 1014 and then presses-in the jog dial wheel 808. In response, the processor 904 executes the application to insert a space.

Screen Shot 1056:

In the screen shot 1056, the cursor 1018 is moved a half-size space to the right in the region 1004, since a space is an ASCII character.

Screen Shot 1058:

To select the fifteenth Hangul consonant in the initial consonant group, the user moves the cursor 1016 to the fifteenth consonant and then presses-in the jog dial wheel 808. In response, the processor 904 executes the application to select the fifteenth consonant from the initial consonant group and display the selected Hangul consonant in the region 1004. The processor 904 then executes the application to display the medial vowel group in the region 1006 and the "initial consonant" (in Hangul) in the region 1010.

Screen Shot 1060:

In the screen shot 1060, the Hangul consonant selected in screen shot 1058 is displayed in the region 1004, and twenty of the twenty one vowels in the medial vowel are displayed in the region 1006. The twenty-first vowel is hidden.

Screen Shot 1062:

To select the fourteenth Hangul vowel in the medial vowel group, the user moves the cursor 1016 to the fourteenth Hangul vowel and then presses-in the jog dial wheel 808. In response, the processor 904 executes the application to select the fourteenth Hangul vowel and display the selected consonant in the region 1004. The processor 904 then executes the application to display the final consonant group in the region 1006 and the "medial vowel" (in Hangul) in the region 1012.

Screen Shot 1064:

In the screen shot 1064, the vowel selected in the screen shot 1062 is displayed in the region 1004, and the twenty of the twenty seven consonants in the final consonant group are displayed in the region 1006. The twenty-first through twenty-seventh consonants in the final consonant group are hidden.

Screen Shot 1066:

To select the sixteenth Hangul consonant from the final consonant group, the user moves the cursor 1016 to the sixteenth Hangul consonant in the final consonant group and then presses-in the jog dial wheel 808. In response, the processor 904 executes the application to select the sixteenth Hangul consonant from the final consonant group and display the selected Hangul consonant in the region 1004. At this point, since a third Hangul character is formed, the processor 904 keeps the final consonant group being displayed on the region 1006.

Screen Shot 1068:

In the screen shot 1068, a third Hangul character is formed in the region 1006. To indicate that the input of the third Hangul character is completed, the user moves the cursor 1016 to the "→" icon in the region 1014 and presses-in the jog dial wheel 808. In response, the processor 904 executes the application to: (1) display the initial consonant group in the region 1006, (2) display the "medial vowel" (in Hangul) in the region 1010, (3) display the "final consonant" (in Hangul) in the region 1012, and (3) move the cursor 1018 one full-size space to the right in the region 1004.

Screen Shot 1070:

In the screen shot 1070, the initial consonant group is displayed in the region 1006. To save the three Hangul characters formed in the region 1004, the user moves the cursor 1016 to the "save" command (in Hangul) in the region 1008 and presses-in the jog dial wheel 808. In response, the processor 904 executes the application to save the three Hangul characters formed in the region 1004 into the Hangul data memory 915. in the present invention, the three groups of Hangul components are stored in the Hangul component storage 913. The application for performing the steps shown in FIG. 10 is stored in the application memory 920. The processor 904 executes the application to perform the steps illustrated in the screen shots shown in FIG. 10.

Although the present invention has been shown and described with respect to preferred embodiments, various changes and modifications are deemed to lie within the spirit and scope of the invention as claimed.

What is claimed is:

1. A method for selecting Hangul components to form Hangul characters, the method comprising the steps of:
   dividing the Hangul components into at least two groups including a first group and a second group, the first group containing a plurality of first group components and the second group containing a plurality of second group components;
   displaying the first group components on a first screen region (1006) located on a screen of a handheld computer device;
   selecting a first group component from the first group, wherein the step of selecting a first group component includes receiving user input by way of a jog dial wheel;
   displaying the second group components on the first screen region;
   selecting a second group component from the second group, wherein the step of selecting a second group component includes receiving user input by way of a jog dial wheel; and
   forming a Hangul character by combining the selected first and second group components.

2. The method of claim 1, further comprising the step of:
   displaying the formed Hangul character in a second screen region (1004) located on the screen.

3. The method of claim 1, further comprising the step of:
   storing the formed Hangul character into a memory device (915).

4. The method of claim 1, wherein the first group components are consonants, and the second group components are vowels.

5. The method of claim 1, wherein the handheld computer device is one of a cellular telephone and a personal digital assistant.

6. A method for selecting Hangul components to form Hangul characters, the method comprising the steps of:
   dividing the Hangul components into three groups including a first group, a second group and a third group, the first group containing a plurality of first group components, the second group containing a plurality of second group components, and the third group containing a plurality of third group components;
   displaying the first group components on a first screen region (1006) located on a screen of a handheld computer device;
   selecting a first group component from the first group, wherein the step of selecting a first group component includes receiving user input by way of a jog dial wheel;
   displaying the second group components on the first screen region;
   selecting a second group component from the second group, wherein the step of selecting a second group component includes receiving user input by way of a jog dial wheel;
   displaying the third group components on the first screen region;
   selecting a third group component from the third group, wherein the step of selecting a third group component includes receiving user input by way of a jog dial wheel; and
   forming a Hangul character by combining the selected first, second and third group components.

7. The method of claim 6, further comprising the step of:
   displaying the Hangul character on a second screen region (1004) located on the screen of the handheld computer device.

8. The method of claim 7, further comprising the step of:
   storing the formed Hangul character into a memory device (915).

9. The method of claim 7, wherein the first group components are initial consonants, the second group components are medial vowels, and the third group components are final consonants.

10. The method of claim 6, wherein the handheld computer device is one of a cellular telephone and a personal digital assistant.

11. An apparatus for selecting Hangul components to form Hangul characters, the apparatus comprising:
    means for dividing the Hangul components into at least two groups including a first group and a second group, the first group containing a plurality of first group components and the second group containing a plurality of second group components;
    means for displaying the first group components on a first screen region (1006) located on a screen of a handheld computer device;
    means for selecting a first group component from the first group, wherein the means for selecting a first group component includes a jog dial wheel;
    means for displaying the second group components on the first screen region;
    means for selecting a second group component from the second group, wherein the means for selecting a second group component includes a jog dial wheel; and
    means for forming a Hangul character by combining the selected first and second group components.

12. The apparatus of claim 11, further comprising:
    means for displaying the formed Hangul character in a second screen region (1004) located on the screen of the handheld computer device.

13. The apparatus of claim 11, further comprising:
    a memory device for storing the formed Hangul character into a memory device (915).

14. The apparatus of claim 11, wherein the first group components are consonants, and the second group components are vowels.

15. The apparatus of claim 11, wherein the handheld computer device is one of a cellular telephone and a personal digital assistant.

16. An apparatus for selecting Hangul components to form Hangul characters, the apparatus comprising:
- means for dividing the Hangul components into three groups including a first group, a second group and a third group, the first group containing a plurality of first group components, the second group containing a plurality of second group components, and the third group containing a plurality of third group components;
- means for displaying the first group components on a first screen region (1006) located on a screen of a handheld computer device;
- means for selecting a first group component from the first group, wherein the means for selecting a first group component includes a jog dial wheel;
- means for displaying the second group components on the first screen region;
- means for selecting a second group component from the second group, wherein the means for selecting a second group component includes a jog dial wheel;
- means for displaying the third group components on the first screen region;
- means for selecting a third group component from the third group, wherein the means for selecting a third group component includes a jog dial wheel; and
- means for forming a Hangul character by combining the selected first, second and third group components.

17. The apparatus of claim 16, further comprising:
- means for displaying the Hangul character in a second screen region (1004) located on the screen of the handheld computer device.

18. The apparatus of claim 16, further comprising:
- a memory device for storing the formed Hangul character into a memory device (915).

19. The apparatus of claim 16, wherein the first group components are initial consonants, the second group components are medial vowels, and the third group components are final consonants.

20. The apparatus of claim 16, wherein the handheld computer device is one of a cellular telephone and a personal digital assistant.

21. A memory device for storing a program being readable and executable by a processor to perform a process for selecting Hangul components to form Hangul characters, the process comprising the steps of:
- dividing the Hangul components into at least two groups including a first group and a second group, the first group containing a plurality of first group components and the second group containing a plurality of second group components;
- displaying the first group components on a first screen region (1006) located on a screen of a handheld computer device;
- selecting a first group component from the first group, wherein the step of selecting a first group component includes receiving user input by way of a jog dial wheel;
- displaying the second group components on the first screen region;
- selecting a second group component from the second group, wherein the step of selecting a second group component includes receiving user input by way of a jog dial wheel; and
- forming a Hangul character by combining the selected first and second group components.

22. The memory device of claim 21, the process further comprising the step of:
- displaying the formed Hangul character in a second screen region (1004) located on the screen of the handheld computer device.

23. The memory device of claim 21, the process further comprising the step of:
- storing the formed Hangul character into a memory device (915).

24. The memory device of claim 21, wherein the first group components are consonants, and the second group components are vowels.

25. A memory device for storing a program being readable and executable by a processor to perform a process for selecting Hangul components to form Hangul characters, the process comprising the steps of:
- dividing the Hangul components into three groups including a first group, a second group and a third group, the first group containing a plurality of first group components, the second group containing a plurality of second group components, and the third group containing a plurality of third group components;
- displaying the first group components on a first screen region (1006) located on a screen of a handheld computer device;
- selecting a first group component from the first group, wherein the step of selecting a first group component includes receiving user input by way of a jog dial wheel;
- displaying the second group components on the first screen region;
- selecting a second group component from the second group, wherein the step of selecting a second group component includes receiving user input by way of a jog dial wheel;
- displaying the third group components on the first screen region;
- selecting a third group component from the third group, wherein the step of selecting a third group component includes receiving user input by way of a jog dial wheel; and
- forming a Hangul character by combining the selected first, second and third group components.

26. The memory device of claim 25, the process further comprising the step of:
- displaying the Hangul character in a second screen region (1004) located on the screen of the handheld computer device.

27. The memory device of claim 25 the process further comprising the step of:
- storing the formed Hangul character into a memory device (915).

28. The memory device of claim 25, wherein the first group components are initial consonants, the second group components are medial vowels, and the third group components are final consonants.

* * * * *

UNITED STATES PATENT AND TRADEMARK OFFICE
CERTIFICATE OF CORRECTION

PATENT NO.    : 6,300,934 B1
DATED         : October 9, 2001
INVENTOR(S)   : Soon Ku; Hiroshi Shirakawa It is certified that error appears in the above-identified patent and that said Letters Patent is hereby corrected as shown below:

<u>Column 9,</u>
Line 12, reads "the Hangul data memory 915.in the present invention, the" and should read -- the Hangul data memory.
   In the present invention, the --

Signed and Sealed this

Twenty-sixth Day of March, 2002

Attest:

Attesting Officer

JAMES E. ROGAN
*Director of the United States Patent and Trademark Office*